United States Patent
Gruter et al.

(10) Patent No.: US 6,489,261 B1
(45) Date of Patent: Dec. 3, 2002

(54) CATALYST COMPOSITION COMPRISING A REDUCED TRANSITION METAL COMPLEX AND A COCATALYST

(75) Inventors: Gerardus J. M. Gruter, Maastricht (NL); Mirko Kranenburg, Maastricht (NL); Marc Herklots, Koermond (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/583,914

(22) Filed: May 31, 2000

Related U.S. Application Data

(63) Continuation of application No. PCT/NL98/00675, filed on Nov. 30, 1998.
(60) Provisional application No. 60/070,187, filed on Dec. 30, 1997.

(30) Foreign Application Priority Data

Dec. 1, 1997 (EP) .............................. 97203755

(51) Int. Cl.[7] .......................... B01J 31/00; B01J 37/00; C08F 4/02; C08F 4/60; C08F 4/44
(52) U.S. Cl. ..................... 502/103; 502/117; 502/152; 502/155; 502/156; 526/134; 526/161; 526/169.2; 526/172
(58) Field of Search ................ 502/103, 155, 502/117, 152, 156; 526/134, 161, 172

(56) References Cited

U.S. PATENT DOCUMENTS

| | | | |
|---|---|---|---|
| 4,057,565 A | | 11/1977 | Manzer |
| 5,374,696 A | | 12/1994 | Rosen |
| 5,856,258 A | * | 1/1999 | Marks et al. ............... 502/104 |
| 5,977,392 A | * | 11/1999 | Royo et al. ................. 502/103 |
| 6,066,704 A | * | 5/2000 | Katayama et al. .......... 502/119 |
| 6,072,067 A | * | 6/2000 | VanBeek et al. ............ 502/103 |
| 6,087,515 A | * | 7/2000 | Eisch et al. ................. 502/103 |
| 6,090,739 A | * | 7/2000 | Riedel et al. ............... 502/103 |
| 6,090,961 A | * | 7/2000 | Hanaoka et al. ............ 502/103 |
| 6,184,319 B1 | * | 2/2001 | Sato et al. ................... 502/117 |
| 6,218,557 B1 | * | 4/2001 | Blankenship ............... 502/103 |
| 6,248,912 B1 | * | 6/2001 | Lang et al. .................. 502/103 |
| 6,329,478 B1 | * | 12/2001 | Katayama et al. .......... 502/155 |
| 6,340,730 B1 | * | 1/2002 | Murray et al. .............. 502/155 |
| 6,376,406 B1 | * | 4/2002 | Ashe, III et al. ........... 502/103 |
| 6,383,968 B1 | * | 5/2002 | Meijers et al. .............. 502/117 |

FOREIGN PATENT DOCUMENTS

| | | | |
|---|---|---|---|
| WO | WO 93/19104 | * | 9/1993 |
| WO | WO 96/13529 | | 5/1996 |

OTHER PUBLICATIONS

US 2002/0058767 A1, U.S. Pre-grant Publication to Yamamoto et al., published May 16, 2002.*

* cited by examiner

Primary Examiner—Mark L. Bell
Assistant Examiner—J. Pasterczyk
(74) Attorney, Agent, or Firm—Pillsbury Winthrop LLP

(57) ABSTRACT

Catalyst compositions include a reduced transition metal complex of structure (I) and a cocatalyst.

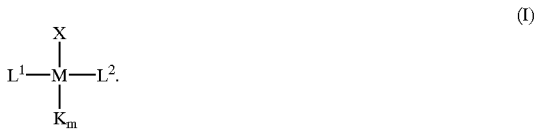

Figure 1:
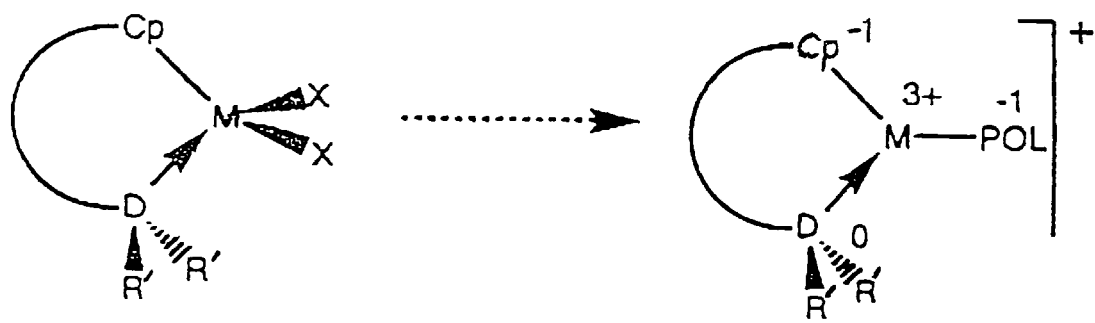

where, $L^1$ and $L^2$, may be the same or different, are anionic ligands, other than cyclopentadienyl group, amido group or phosphidino group. At least $L^1$ is able to non-covalently interact with reduced transition metal M via one or more functional groups; for example, $L^1$ can be a phenyl group in which at least one of the ortho-positions is substituted with a functional group capable of donating electron density to the transition metal M. $L^1$ can also be a methyl group in which one or more or the alpha-positions is substituted with a functional group capable of donating electron density to the transition metal M. X, K, and m are defined in the specification. These catalysts may be easily formed as solids and provide improved catalytic performance.

24 Claims, 5 Drawing Sheets

CATALYST COMPOSITION COMPRISING A REDUCED TRANSITION METAL COMPLEX AND A COCATALYST

The invention relates to a catalyst composition comprising a reduced transition metal complex and a cocatalyst.

Catalyst compositions comprising a reduced transition metal complex and a cocatalyst are known from WO-A-96/13529.

In this patent application the reduced transition metal complex of the catalyst composition is represented by the following formula (I):

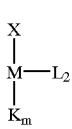

(I)

wherein the symbols have the following meanings:

M a reduced transition metal selected from group 4, 5 or 6 of the Periodic Table of Elements;

X a multidentate monoanionic ligand represented by the formula: $(Ar—R_t—)_s Y(—R_t—DR'_n)_q$;

Y a cyclopentadienyl, amido (—NR'—), or phosphido group (—PR'—), which is bonded to the reduced transition metal M;

R at least one member selected from the group consisting of (i) a connecting group between the Y group and the $DR'_n$ group and (ii) a connecting group between the Y group and the Ar group, wherein when the ligand X contains more than one R group, the R groups can be identical to or different from each other;

D an electron-donating hetero atom selected from group 15 or 16 of the Periodic Table of Elements;

R' a substituent selected from the group consisting of a hydrogen, hydrocarbon radical and hetero atom-containing moiety, except that R' cannot be hydrogen when R' is directly bonded to the electron-donating hetero atom D, wherein when the multidentate monoanionic ligand X contains more than one substituent R', the substituents R' can be identical or different from each other;

Ar an electron-donating aryl group;

L a monoanionic ligand bonded to the reduced transition metal M, wherein at least one L is an electron-donating ligand bonded to M via a metal-carbon bond, and wherein this ligand L is not methyl or benzyl;

K a neutral or anionic ligand bonded to the reduced transition metal M, wherein when the transition metal complex contains more than one ligand K, the ligands K can be identical or different from each other;

m is the number of K ligands, wherein when the K ligand is an anionic ligand m is 0 for $M^{3+}$, m is 1 for $M^{4+}$, and m is 2 for $M^{5+}$, and when K is a neutral ligand m increases by one for each neutral K ligand;

n the number of the R' groups bonded to the electron-donating hetero atom D, wherein when D is selected from group 15 of the Periodic Table of Elements n is 2, and when D is selected from group 16 of the Periodic Table of Elements n is 1;

q,s q and s are the number of $(—R_t—DR'_n)$ groups and $(Ar—R_t)$ groups bonded to group Y, respectively, wherein q+s is an integer not less than 1; and t the number of R groups connecting each of (i) the Y and Ar groups and (ii) the Y and $DR'_n$ groups, wherein t is selected independently as 0 or 1.

It has now surprisingly been found that when at least one of the monoanionic ligands L in the reduced transition metal complex is bonded to the reduced transition metal M via a covalent metal-carbon bond and additionally this L is capable to non-covalently interact with the metal via one or more functional groups the catalyst composition is more active during olefin polymerisation. A further advantage of the catalyst composition according to the invention is that the reduced transition metal complex is more stable, and can often be obtained as a solid. Therefore the transition metal complex is easier obtained in a pure form and is easier to handle when it is used for olefin polymerisation. When a catalyst composition that is used for olefin polymerization is more active, more polymer per unit of time is produced when using a fixed amount of this catalyst. This is very advantageous in olefin polymerization because polyolefins are produced in large amounts.

Various components of the transition metal complex are discussed below in more detail.

(a) The Transition Metal (M)

The transition metal in the complex is selected from groups 4–6 of the Periodic Table of Elements. As referred to herein, all references to the Periodic Table of Elements mean the version set forth in the new IUPAC notation found on the inside of the cover of the Handbook of Chemistry and Physics, 70th edition, 1989/1990, the complete disclosure of which is incorporated herein by reference.

The transition metal is present in reduced form in the complex, which means that the transition metal is in a reduced oxidation state. As referred to herein, "reduced oxidation state" means an oxidation state which is greater than zero but lower than the highest possible oxidation state of the metal (for example, the reduced oxidation state is at most $M^{3+}$ for a transition metal of group 4, at most $M^{4+}$ for a transition metal of group 5 and at most $M^{5+}$ for a transition metal of group 6).

(b) The X Ligand

The X ligand is a multidentate monoanionic ligand represented by the formula: $(Ar—R_t—)_s Y(—R_t—DR'_n)_q$.

As referred to herein, a multidentate monoanionic ligand is bonded with a covalent bond to the reduced transition metal (M) at one site (the anionic site, Y) and is bonded either (i) with a coordinate bond to the transition metal at one other site (bidentate) or (ii) with a plurality of coordinate bonds at several other sites (tridentate, tetradentate, etc.). Such coordinate bonding can take place, for example, via the D heteroatom or Ar group(s). Examples of tridentate monoanionic ligands include, without limitation, $Y—R_t—DR'_{n-1}—R_t—DR'_n$ and $Y(—R—DR'_n)_2$. It is noted, however, that heteroatom(s) or aryl substituent(s) can be present on the Y group without coordinately bonding to the reduced transition metal M, so long as at least one coordinate bond is formed between an electron-donating group D or an electron donating Ar group and the reduced transition metal M.

R represents a connecting or bridging group between the $DR'_n$ and Y, and/or between the electron-donating aryl (Ar) group and Y. Since R is optional, "t" can be zero. The R group is discussed below in paragraph (d) in more detail.

(c) The Y Group

The Y group of the multidentate monoanionic ligand (X) is preferably a cyclopentadienyl, amido (—NR'—), or phosphido (—PR'—) group.

Most preferably, the Y group is a cyclopentadienyl ligand (Cp group). As referred to herein, the term cyclopentadienyl group encompasses substituted cyclopentadienyl groups such as indenyl, fluorenyl, and benzoindenyl groups, and other polycyclic aromatics containing at least one 5-member dienyl ring, so long as at least one of the substituents of the Cp group is an $R_t$—$DR'_n$ group or $R_t$—Ar group that replaces one of the hydrogens bonded to the five-member ring of the Cp group via an exocyclic substitution.

Examples of a multidentate monoanionic ligand with a Cp group as the Y group (or ligand) include the following (with the (—$R_t$—$DR'_n$) or (Ar—$R_t$—) substituent on the ring):

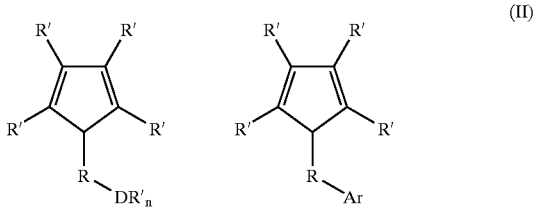

(II)

The Y group can also be a hetero cyclopentadienyl group. As referred to herein, a hetero cyclopentadienyl group means a hetero ligand derived from a cyclopentadienyl group, but in which at least one of the atoms defining the five-member ring structure of the cyclopentadienyl is replaced with a hetero atom via an endocyclic substitution. The hetero Cp group also includes at least one $R_t$—$DR'_n$ group or $R_t$—Ar group that replaces one of the hydrogens bonded to the five-member ring of the Cp group via an exocyclic substitution. As with the Cp group, as referred to herein the hetero Cp group encompasses indenyl, fluorenyl, and benzoindenyl groups, and other polycyclic aromatics containing at least one 5-member dienyl ring, so long as at least one of the substituents of the hetero Cp group is an $R_t$—$DR'_n$ group or $R_t$—Ar group that replaces one of the hydrogens bonded to the five-member ring of the hetero Cp group via an exocyclic substitution.

The hetero atom can be selected from group 14, 15 or 16 of the Periodic Table of Elements. If there is more than one hetero atom present in the five-member ring, these hetero atoms can be either the same or different from each other. More preferably, the hetero atom(s) is/are selected from group 15, and still more preferably the hetero atom(s) selected is/are phosphorus.

By way of illustration and without limitation, representative hetero ligands of the X group that can be practiced in accordance with the present invention are hetero cyclopentadienyl groups having the following structures, in which the hetero cyclopentadienyl contains one phosphorus atom (i.e., the hetero atom) substituted in the five-member ring:

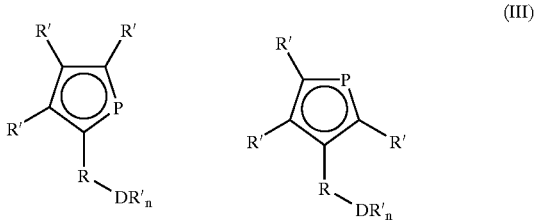

(III)

It is noted that, generally, the transition metal group M is bonded to the Cp group via an $\eta^s$ bond.

The other R' exocyclic substituents (shown in formula (III)) on the ring of the hetero Cp group can be of the same type as those present on the Cp group, as represented in formula (II). As in formula (II), at least one of the exocyclic substituents on the five-member ring of the hetero cyclopentadienyl group of formula (III) is the $R_t$—$DR'_n$ group or the $R_t$—Ar group.

The numeration of the substitution sites of the indenyl group is in general and in the present description based on the IUPAC Nomenclature of Organic Chemistry 1979, rule A 21.1. The numeration of the substituent sites for indene is shown below. This numeration is analogous for an indenyl group:

The Y group can also be an amido (—NR'—) group or a phosphido (—PR'—) group. In these alternative embodiments, the Y group contains nitrogen (N) or phosphorus (P) and is bonded covalently to the transition metal M as well as to the (optional) R group of the (—$R_t$—$DR'_n$) or (Ar—$R_t$—) substituent. The Y group can also be a boratabenzene group. In this alternative embodiment, the Y group is a six membered aromatic ring containing 5 carbons and a boron atom. The boratabenzene ring may be substituted.

(d) The R Group

The R group is optional, such that it can be absent from the X group. Where the R group is absent, the $DR'_n$ or Ar group is bonded directly to the Y group (that is, the $DR'_n$ or Ar group is bonded directly to the Cp, amido, or phosphido group). The presence or absence of an R group between each of the $DR'_n$ groups and/or Ar groups is independent.

Where at least one of the R groups is present, each of the R group constitutes the connecting bond between, on the one hand the Y group, and on the other hand the $DR'_n$ group or the Ar group. The presence and size of the R group determines the accessibility of the transition metal M relative to the $DR'_n$ or Ar group, which gives the desired intramolecular coordination. If the R group (or bridge) is too short or absent, the donor may not coordinate well due to ring tension. The R groups are each selected independently, and can generally be, for example, a hydrocarbon group with 1–20 carbon atoms (e.g., alkylidene, arylidene, aryl alkylidene, etc.). Specific examples of such R groups include, without limitation, methylene, ethylene, propylene, butylene, phenylene, whether or not with a substituted side chain. Preferably, the R group has the following structure:

$(-ER'_2-)_p$ (IV)

wherein p is 1, 2, 3, or 4 and wherein E is an element from group 14 of the Periodic Table of the Elements and wherein each E may be the same or different. The R' groups of formula (IV) can each be selected independently, and can be the same as the R' groups defined below in paragraph (g).

In addition to carbon, the main chain of the R group can also contain silicon or germanium. Examples of such R groups are: dialkyl silylene (—$SiR'_2$—), dialkyl germylene (—$GeR'_2$—), tetra-alkyl silylene (—$SiR'_2$—$SiR'_2$—), or tetraalkyl silaethylene (—$SiR'_2CR'_2$—). The alkyl groups in such a group preferably have 1–4 carbon atoms and more preferably are a methyl or ethyl group.

(e) The $DR'_n$ Group

This donor group consists of an electron-donating hetero atom D, selected from group 15 or 16 of the Periodic Table of Elements, and one or more substituents R' bonded to D. The number (n) of R' groups is determined by the nature of the hetero atom D, insofar as n being 2 if D is selected from group 15 and n being 1 if D is selected from group 16. The R' substituents bonded to D can each be selected independently, and can be the same as the R' groups defined below in paragraph (g), with the exception that the R' substituent bonded to D cannot be hydrogen.

The hetero atom D is preferably selected from the group consisting of nitrogen (N), oxygen (O), phosphorus (P) and sulphur (S); more preferably, the hetero atom is nitrogen (N). Preferably, the R' group is an alkyl, more preferably an n-alkyl group having 1–20 carbon atoms, and most preferably an n-alkyl having 1–8 carbon atoms. It is further possible for two R' groups in the $DR'_n$ group to be connected with each other to form a ring-shaped structure (so that the $DR'_n$ group can be, for example, a pyrrolidinyl group). The $DR'_n$ group can form coordinate bonds with the transition metal M.

(f) The Ar Group

The electron-donating group (or donor) selected can also be an aryl group ($C_6R'_5$), such as phenyl, tolyl, xylyl, mesityl, cumenyl, tetramethyl phenyl, pentamethyl phenyl, a polycyclic group such as triphenylmethane, etc. The electron-donating group D of formula (I) cannot, however, be a substituted Cp group, such as an indenyl, benzoindenyl, or fluorenyl group.

The coordination of this Ar group in relation to the transition metal M can vary from $\eta^1$ to $\eta^6$.

(g) The R' Group

The R' groups may each separately be hydrogen or a hydrocarbon radical with 1–20 carbon atoms (e.g. alkyl, aryl, aryl alkyl and the like). Examples of alkyl groups are methyl, ethyl, propyl, butyl, hexyl and decyl. Examples of aryl groups are phenyl, mesityl, tolyl and cumenyl. Examples of aryl alkyl groups are benzyl, pentamethylbenzyl, xylyl, styryl and trityl. Examples of other R' groups are halides, such as chloride, bromide, fluoride and iodide, methoxy, ethoxy and phenoxy.

Also, two adjacent hydrocarbon radicals of the Y group can be connected with each other to define a ring system; therefore the Y group can be an indenyl, a fluorenyl or a benzoindenyl group. The indenyl, fluorenyl, and/or benzoindenyl can contain one or more R' groups as substituents. R' can also be a substituent which instead of or in addition to carbon and/or hydrogen can comprise one or more hetero atoms of groups 14–16 of the Periodic Table of Elements. Thus, a substituent can be, for example, a Si-containing group, such as $Si(CH_3)_3$.

(h) The L Group

The transition metal complex contains one monoanionic ligand $L^1$ bonded to the reduced transition metal center M via a covalent metal-carbon bond and additionally $L^1$ is capable to non-covalently interact with M via one or more functional groups and wherein $L^1$ is not a cyclopentadienyl group, an amido or phosphido group or an unsubstituted benzyl group.

The functional group mentioned above can be one atom, but also a group of atoms connected together. The functional group is preferably an atom of group 17 of the Periodic Table of the Elements or a group containing one or more elements from groups 15, 16 or 17 of the Periodic Table of the Elements. Examples of functional groups are F, Cl, Br, dialkylamino and alkoxy groups.

$L^1$ can for instance be a phenyl group in which at least one of the ortho-positions is substituted with a functional group capable of donating electron density to the transition metal M. $L^1$ can also be a methyl group in which one or more of the alpha-positions is substituted with a functional group capable of donating electron density to the transition metal M.

Examples of methyl groups substituted in one or more of the alpha-positions are benzyl, diphenylmethyl, ethyl, propyl and butyl substituted with a functional group capable of donating electron density to the transition metal M. Preferably at least one of the ortho-positions of a benzyl-group is substituted with a functional group capable of donating electron density to the transition metal M.

Examples of $L^1$ groups are: 2,6-difluorophenyl, 2,4,6-trifluorophenyl, pentafluorophenyl, 2-alkoxyphenyl, 2,6-dialkoxyphenyl, 2,4,6-tri(trifluoromethyl)phenyl, 2,6-di(trifluoromethyl)phenyl, 2-trifluoromethylphenyl, 2-(dialkylamino)benzyl and 2,6-(dialkylamino)phenyl. Most preferably $L^1$ is pentafluorophenyl or 2,6-dimethoxyphenyl because when these $L^1$ groups are used very stable transition metal complexes are formed. $L^2$ is an anionic ligand with the exclusion of a cyclopentadienyl group, an amido or phosphido group. Examples of $L^2$ are a hydrogen atom, a halogen atom, an alkyl aryl or aralkyl group, an alkoxy or aryloxy group. Preferably, $L^2$ is a halogenide or an alkyl or aryl group; more preferably, a Cl group and/or a $C_1$–$C_4$ alkyl or a benzyl group. The $L^2$ group can also be connected to $L^1$ to form a dianionic bidentate ring system. Optionally $L^2$ is equal to $L^1$.

(i) The K Ligand

The K ligand is a neutral or anionic group bonded to the transition metal M. When K is a neutral ligand K may be absent, but when K is monoanionic, the following holds for $K_m$:

m=0 for $M^{3+}$ and M selected from groups 4, 5 or 6 of the Periodic Table of the Elements, m=1 for $M^{4+}$ and M selected from groups 5 or 6 of the Periodic Table of the Elements, m=2 for $M^{5+}$ and M selected from group 6 of the Periodic Table of the Elements, On the other hand, neutral K ligands, which by definition are not anionic, are not subject to the same rule. Therefore, for each neutral K ligand, the value of m (i.e., the number of total K ligands) is one higher than the value stated above for a complex having all monoanionic K ligands.

The K ligand can be a ligand as described above for the $L^2$ group or a Cp group (—$C_5R'_5$), an amido group (—$NR'_2$) or a phosphido group (—$PR'_2$). The K group can also be a neutral ligand such as an ether, an amine, a phosphine, a thioether, among others.

If two K groups are present, the two K groups can be connected with each other via an R group to form a bidentate ring system.

As can also be seen from formula (I), the X group of the complex contains a Y group to which are linked one or more donor groups (the Ar group(s) and/or $DR'_n$ group(s)) via, optionally, an R group. The number of donor groups linked to the Y group is at least one and at most the number of substitution sites present on a Y group.

With reference, by way of example, to the structure according to formula (II), at least one substitution site on a Cp group is made by an $R_t$—Ar group or by an $R_t$—$DR'_n$ group (in which case q+s=1). If all the R' groups in formula (II) were $R_t$—Ar groups, $R_t$—$DR'_n$ groups, or any combination thereof, the value of (q+s) would be 5.

One preferred embodiment of the catalyst composition according to the present invention comprises a transition metal complex in which a bidentate/monoanionic ligand is present and in which the reduced transition metal has been selected from group 4 of the Periodic Table of Elements and has an oxidation state of +3.

In this case, the catalyst composition according to the invention comprises a transition metal complex represented by formula (V):

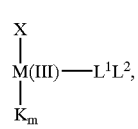

(V)

where the symbols have the same meaning as described above for formula (I) and where M(III) is a transition metal selected from group 4, 5 or 6 of the Periodic Table of Elements and is in oxidation state 3+. Most preferably M(III) is Ti(III) or Cr(III).

Such a transition metal complex has no anionic K ligands (for an anionic K, m=0 in case of $M^{3+}$).

It should be pointed out that in WO-A-93/19104, transition metal complexes are described in which a group 4 transition metal in a reduced oxidation state (3+) is present. The complexes described in WO-A-93/19104 have the general formula:

$$Cp_a(ZY)_bML_c \qquad (VI)$$

The Y group in this formula (VI) is a hetero atom, such as phosphorus, oxygen, sulfur, or nitrogen bonded covalently to the transition metal M (see p. 2 of WO-A-93/19104). This means that the CPa(ZY)b group is of a dianionic nature, and has the anionic charges residing formerly on the Cp and Y groups. Accordingly, the $CP_a(ZY)_b$ group of formula (VI) contains two covalent bonds: the first being between the 5-member ring of the Cp group and the transition metal M, and the second being between the Y group and the transition metal. By contrast, the X group in the complex according to the present invention is of a monoanionic nature, such that a covalent bond is present between the Y group (e.g., the Cp group) and transition metal, and a coordinate bond can be present between the transition metal M and one or more of the $(Ar-R_r-)$ and $(-R_r-DR'_n)$ groups. This changes the nature of the transition metal complex and consequently the nature of the catalyst that is active in the polymerization. As referred to herein, a coordinate bond is a bond (e.g., $H_3N-BH_3$) which when broken, yields either (i) two species without net charge and without unpaired electrons (e.g., $H_3N$: and $BH_3$) or (ii) two species with net charge and with unpaired electrons (e.g., $H_3N.^+$ and $BH_3.^-$). On the other hand, as referred to herein, a covalent bond is a bond (e.g., $CH_3-CH_3$) which when broken yields either (i) two species without net charge and with unpaired electrons (e.g., $CH_3$. and $CH_3$.) or (ii) two species with net charges and without unpaired electrons (e.g., $CH_3^+$ and $CH_3:^-$). A discussion of coordinate and covalent bonding is set forth in Haaland et al. (Angew. Chem Int. Ed. Eng. Vol. 28, 1989, p. 992), the complete disclosure of which is incorporated herein by reference.

The following explanation is proposed, although it is noted that the present invention is in no way limited to this theory.

Figure 2:
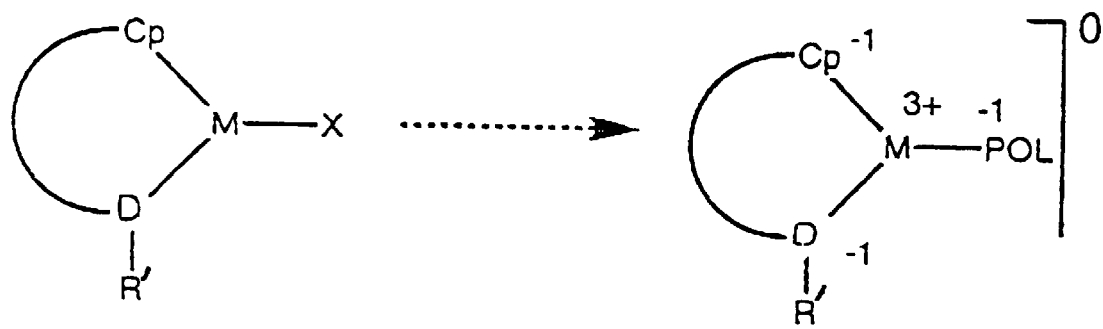

Referring now more particularly to FIG. 2, the transition metal complexes described in WO-A-93/19104 are ionic after interaction with the co-catalyst. However, the transition metal complex according to WO-A-93/19104 that is active in the polymerization contains an overall neutral charge (on the basis of the assumption that the polymerizing transition metal complex comprises, a M(III) transition metal, one dianionic ligand and one growing monoanionic polymer chain (POL)). By contrast, as shown in FIG. 1, the polymerization active transition metal complex of the catalyst composition according to the present invention is of a cationic nature (on the basis of the assumption that the polymerizing transition metal complex—based on the formula (V) structure—comprises, a M(III) transition metal, one monoanionic bidentate ligand and one growing monoanionic polymer chain (POL)).

Transition metal complexes in which the transition metal is in a reduced oxidation state, but have the following structure:

$$Cp-M(III)-L_2 \qquad (VII)$$

are generally not active in co-polymerization reactions. It is precisely the presence, in the transition metal complex of the present invention, of the $DR'_n$ or Ar group (the donor), optionally bonded to the Y group by means of the R group, that gives a stable transition metal complex suitable for polymerization.

Such an intramolecular donor is to be preferred over an external (intermolecular) donor on account of the fact that the former shows a stronger and more stable coordination with the transition metal complex.

It will be appreciated that the catalyst system may also be formed in situ if the components thereof are added directly to the polymerization reactor system and a solvent or diluent, including liquid monomer, is used in said polymerization reactor.

The catalyst composition of the present invention also contains a co-catalyst. For example, the co-catalyst can be an organometallic compound. The metal of the organometallic compound can be selected from group 1, 2, 12 or 13 of the Periodic Table of Elements. Suitable metals include, for example and without limitation, sodium, lithium, zinc, magnesium, and aluminum, with aluminum being preferred. At least one hydrocarbon radical is bonded directly to the metal to provide a carbon-metal bond. The hydrocarbon group used in such compounds preferably contains 1–30, more preferably 1–10 carbon atoms. Examples of suitable compounds include, without limitation, amyl sodium, butyl lithium, diethyl zinc, butyl magnesium chloride, and dibutyl magnesium. Preference is given to organoaluminium compounds, including, for example and without limitation, the following: trialkyl aluminum compounds, such as tri-ethyl aluminum and tri-isobutyl aluminum; alkyl aluminum hydrides, such as di-isobutyl aluminum hydride; alkylalkoxy organoaluminium compounds; and halogen-containing organoaluminium compounds, such as diethyl aluminum chloride, diisobutyl aluminum chloride, and ethyl aluminum sesquichloride. Preferably, aluminoxanes are selected as the organoaluminium compound.

In addition or as an alternative to the organometallic compounds as the co-catalyst, the catalyst composition of the present invention can include a compound which contains or yields in a reaction with the transition metal complex of the present invention a non-coordinating or poorly coordinating anion. Such compounds have been described for instance in EP-A-426,637, the complete disclosure of which is incorporated herein by reference. Such an anion is bonded sufficiently unstably such that it is replaced by an unsaturated monomer during the co-polymerization. Such compounds are also mentioned in EP-A-277,003 and EP-A-277,004, the complete disclosures of which are incorporated herein by reference. Such a compound preferably contains a triaryl borane or a tetraaryl borate or an aluminum or silicon equivalent thereof. Examples of suitable co-catalyst compounds include, without limitation, the following:
dimethyl anilinium tetrakis (pentafluorophenyl) borate $[C_6H_5N(CH_3)_2H]^+ [B(C_6F_5)_4]^-$;
dimethyl anilinium bis(7,8-dicarbaundecaborate)-cobaltate (III);
tri(n-butyl)ammonium tetraphenyl borate;
triphenylcarbenium tetrakis (pentafluorophenyl) borate;
dimethylanilinium tetraphenyl borate;
tris(pentafluorophenyl) borane; and
tetrakis(pentafluorophenyl) borate.

As described for instance in EP-A-500,944, the complete disclosure of which is incorporated herein by reference, the reaction product of a halogenated transition metal complex and an organometallic compound, such as for instance triethyl aluminum (TEA), can also be used.

The molar ratio of the co-catalyst relative to the transition metal complex, in case an organometallic compound is selected as the co-catalyst, usually is in a range of from about 1:1 to about 10,000:1, and preferably is in a range of from about 1:1 to about 2,500:1. If a compound containing or yielding a non-coordinating or poorly coordinating anion is selected as co-catalyst, the molar ratio usually is in a range of from about 1:100 to about 1,000:1, and preferably is in a range of from about 1:2 to about 250:1.

As a person skilled in the art would be aware, the transition metal complex as well as the co-catalyst can be present in the catalyst composition as a single component or as a mixture of several components. For instance, a mixture may be desired where there is a need to influence the molecular properties of the polymer, such as molecular weight and in particular molecular weight distribution.

The catalyst composition according to the invention can be used by a method known as such as a catalyst component for the polymerization of an olefin. The olefin envisaged in particular is an olefin chosen from the group comprising α-olefin, internal olefin, cyclic olefin and di-olefin. Mixtures of these can also be used.

The invention relates in particular to a process for the polymerization of an α-olefin. The α-olefin is preferably chosen from the group comprising ethene, propene, butene, pentene, heptene, octene and styrene (substituted or non-substituted), mixtures of which may also be used. More preferably, ethene and/or propene is used as α-olefin. The use of such olefins results in the formation of (semi) crystalline polyethene homo- and copolymers, of high as well as of low density (HDPE, LDPE, LLDPE, etc.), and polypropene, homo- and copolymers (PP and EMPP). The monomers needed for such products and the processes to be used are known to the person skilled in the art.

The process according to the invention is also suitable for the preparation of amorphous or rubber-like copolymers based on ethene and another α-olefin. Propene is preferably used as the other α-olefin, so that EPM rubber is formed. It is also quite possible to use a diene besides ethene and the other α-olefin, so that a so-called EADM rubber is formed, in particular EPDM (ethene propene diene rubber).

The catalyst composition according to the invention can be used supported as well as non-supported. The supported catalysts are used mainly in gas phase and slurry processes. The carrier used may be any carrier known as carrier material for catalysts, for instance $SiO_2$, $Al_2O_3$ or $MgCl_2$.

Polymerization of the olefins can be effected in a known manner, in the gas phase as well as in a liquid reaction mediun. In the latter case, both solution and suspension polymerization are suitable, while the quantity of transition metal to be used generally is such that its concentration in the dispersion agent amounts to $10^{-8}$–$10^{-4}$ mol/l, preferably $10^{-7}$–$10^{-3}$ mol/l.

The process according to the invention will hereafter be elucidated with reference to a polyethene preparation known per se, which is representative of the olefin polymerizations meants here. For the preparation of other polymers on the basis of an olefin the reader is expresely referred to the multitde of publications on this subject.

The preparation of polyethene relates to a process for homopolymerization or copolymerization of ethene with one or more α-olefins having 3–12 carbons atoms and optionaly one or more non-conjugated dienes. The α-olefins that are suitable in particular are propene, butene, hexene and octene. Suitable dienes are for instance 1,7-octadiene and 1,9-decadiene. It has been found that the catalyst composition of the present invention is especially suitable for solution or suspension polymerization of ethene.

Any liquid that is inert relative to the catalyst system can be used as dispersion agent in the polymerization. One or more saturated, straight or branched aliphatic hydrocarbons, such as butanes, pentanes, hexanes, heptanes, pentamethyl heptane or mineral oil fractions such as light or regular petrol, naphtha, kerosine or gas oil are suitable for that purpose. Aromatic hydrocarbons, for instance benzene and toluene, can be used, but because of their cost as well as on account of safety considerations, it will be preferred not to use such solvents for production on a technical scale. In polymerization processes on a technical scale, it is preferred therefore to use as solvent the low-priced aliphatic hydrocarbons or mixtures thereof, as marketed by the petrochemical industry. If an aliphatic hydrocarbon is used as solvent, the solvent may yet contain minor quantities of aromatic hydrocarbon, for instance toluene. Thus, if for instance methyl aluminoxane (MAO) is used as co-catalyst, toluene can be used as solvent in order to supply the MAO in dissolved form to the polymerization reactor. Drying or purification is desirable if such solvents are used; this can be done without problems by the average person skilled in the art.

Such a solution polymerization is preferably carried out at temperatures between 150° C. and 250° C.; in general, a suspension polymerization takes place at lower temperatures, preferably below 100° C.

The polymer solution resulting from the polymerization can be worked up by a method known per se. In general the catalyst is de-activated at some point during the processing of the polymer. The de-activation is also effected in a manner known per se, e.g. by means of water or an alcohol. Removal of the catalyst residues can mostly be omitted because the quantity of catalyst in the polymer, in particular the content of halogen and transition metal is very low now owing to the use of the catalyst system according to the invention.

Polymerization can be effected at atmospheric pressure, but also at an elevated pressure of up to 500 MPa, continuously or discontinuously. If the polymerization is carried out under pressure the yield of polymer can be increased additionally, resulting in an even lower catalyst residue content. Preferably, the polymerization is performed at pressures between 0.1 and 25 MPa. Higher pressures, of 100 MPa and upwards, can be applied if the polymerization is carried out in so-called high-pressure reactors. In such a high-pressure process the catalyst according to the present invention can also be used with good results.

The polymerization can also be performed in several steps, in series as well as in parallel. If required, the catalyst composition, temperature, hydrogen concentration, pressure, residence time, etc. may be varied from step to step. In this way it is also possible to obtain products with a wide molecular weight distribution.

The invention also relates to a polyolefin that can be obtained by means of a polymerization process with utilization of the catalyst composition according to the invention.

The invention will now be elucidated by means of the following non-restrictive examples.

Experimental

All synthesis, unless stated otherwise, were performed under nitrogen using standard Schlenk or glovebox techniques. The solvents were dried and freshly distilled before use. Diethyl ether and ligroin were distilled from Na/K alloy with benzophenone as an indicator, toluene was distilled from Na/benzophenone and tetrahydrofuran (THF) from K/benzophenone.

All commercially available starting materials were obtained from Aldrich Chemical Company. The catalyst complexes were prepared according to the methods described in WO-A-96/13529.

In the following Me=methyl, Bu=butyl, iPr=isopropyl, SiMe$_3$=trimethylsilyl, Ph=phenyl, C$_6$H$_3$-2,6-F$_2$=2,6-difluorophenyl, C$_6$F$_5$=pentafluorophenyl, C$_6$H$_3$-2,6—(OMe)$_2$=2,6-dimethoxyphenyl, CH$_2$C$_6$H$_4$—o—NMe$_2$=α-(ortho-toluidyl), C$_6$H$_4$—o—CH$_2$NMe$_2$=2- (N,N-dimethylaminomethyl)benzene.

EXAMPLE I
The Synthesis of 2-(lithiomethyl)-N,N-dimethylaniline

N,N-dimethyl-toluidine (10.3 ml, 71 mmol) was dissolved in 30 ml of ligroin and 5 ml of ether, and 44.4 ml of a 1.6M solution of n-butyllithium in ligroin (71 mmol) was added dropwise at room temperature. The reaction mixture was left to stir overnight, and a large amount of light-yellow precipitate was formed. The supernatant was removed using a syringe, and the resulting precipitate was washed with ligroin (3 times 20 ml), then dried under vacuo. The resulting pale yellow pyroforic powder was obtained in quantitative yield.

EXAMPLE II
The Synthesis of 2-lithio-anisole 10 ml of anisole (93 mmol, distilled from Na) and 15.1 ml of THF (186 mmol) were dissolved in 50 ml of ligroin. Then 58.1 ml of a 1.6 M solution of n-butyllithium in ligroin (93 mmol) was added at room temperature. The reaction mixture was heated to reflux for 4 hours, then allowed to cool to room temperature. A white precipitate was formed, which was decanted using a syringe, and washed with ligroin until the washings where colourless. The product was evaporated to dryness.

EXAMPLE III
The Synthesis of 2-lithio-1,3-dimethoxybenzene 10 ml of 1,3-dimethoxybenzene (68.6 mmol, distilled from Na) was dissolved in 11.1 ml of THF (137 mmol). The reaction mixture was cooled to −30° C., then 42.9 ml of a 1.6 M solution of n-butyllithium in ligroin (68.8 mmol) was added dropwise in ca. 30 minutes. The cooling bath was removed, and the reaction mixture was stirred overnight, during which period the mixture was allowed to warm to room temperature. A white precipitate was formed, which was decanted using a syringe, and washed with ligroin until the washings where colourless. Product was evaporated to dryness. The yield was quantitative.

EXAMPLE IV
The Synthesis of [(Me$_2$NC$_2$H$_4$)C$_5$ME$_4$]Ti[C$_6$H$_4$-o-CH$_2$NMe$_2$)$_2$ N,N-dimethylbenzylamine (5 g, 37 mmol) was dissolved in 35 ml of ether, and 25 ml of a 1.6 M solution of n-butyllithium in ligroin (37 mmol) was added dropwise at room temperature. The reaction mixture was left to stir overnight, and a large amount of white precipitate was formed. The supernatant was removed using a syringe, and the resulting precipitate was washed with ligroin (3×20 ml), then dried under vacuo. The yield of the fine white powdered product was quantitative.

0.3 g of [(Me$_2$NC$_2$H$_4$)C$_5$Me$_4$]TiCl$_2$.LiCl (0.85 mmol) was suspended in 10 ml of ether, and cooled to −70° C. (dry ice/acetone bath). In a separate vessel 0.24 g of 2-(N,N-dimethylaminomethyl)lithiobenzeen (1.7 mmol) was suspended in 10 ml of ether, and cooled to −70° C. (dry ice/acetone bath), and added to the Ti-suspension via a cannula. The emptied vessel was flushed with 5 ml of cooled ether, to ensure that all material was added.

The resulting mixture was stirred vigorously, and allowed to warm to room temperature upon which a colouration to green was observed. The reaction mixture was stirred overnight, after which the salts formed were removed by filtration, and the solvent was then removed under vacuo. Yield: 57.5%.

EXAMPLE V–VII

Example V

The Synthesis of [(Me$_2$NC$_2$H$_4$)C$_5$Me$_4$]Ti[CH$_2$C$_6$H$_4$-o-NMe$_2$)$_2$ 0.3 g of [(Me$_2$NC$_2$H$_4$)C$_5$Me$_4$]TiCl$_2$.LiCl (0.85 mmol) was suspended in 10 ml of ether, and cooled to −70° C. (dry ice/acetone bath). In a separate vessel 0.24 g of 2-(lithiomethyl)-N,N-dimethylaniline (1.7 mmol, see Example I) was suspended in 10 m of ether, and cooled to −70° C. (dry ice/acetone bath), and added to the Ti-suspension via a cannula. The emptied vessel was flushed with 5 ml of cooled ether, to ensure that all material was added.

The resulting beige-brown mixture was stirred vigorously, and allowed to warm to room temperature upon which a colouration to army green was observed. The reaction mixture was stirred overnight, after which the salts formed were removed by filtration, and the solvent was then removed under vacuo.

Yield: 86%

EXAMPLE VI and VII

[(Me$_2$NC$_2$H$_4$)C$_5$H(iPr)$_3$]Ti(CH$_2$—C$_6$H$_4$-2-NMe$_2$)$_2$ and [(Me$_2$NC$_2$H$_4$)C$_5$H$_2$(SiMe$_3$)$_2$]Ti(CH$_2$—C$_6$H$_4$-2-NMe$_2$)$_2$ were prepared analogously.

EXAMPLE VIII
The Synthesis of [Me$_2$NC$_2$H$_4$)C$_5$Me$_4$]Ti(2-anisyl)$_2$ 0.3 g of [Me$_2$NC$_2$H$_4$)C$_5$Me$_4$]TiCl$_2$.LiCl (0.85 mmol) was suspended in 10 ml of ether, and cooled to —70° C. (dry ice/acetone bath). In a separate vessel 0.44 g of 2-lithioanisole. 2 THF (1.7 mmol, Example II) was suspended in 10 ml of ether, and cooled to −70° C. (dry ice/acetone bath), and added to the Ti-suspension via a cannula. The emptied vessel was flushed with 5 ml of cooled ether, to ensure that all material was added. The resulting beige-brown mixture was stirred vigorously, and allowed to warm to room temperature upon which a colouration to olive green was observed, together with the formation of a fine white precipitate (LiCl). The reaction mixture was stirred overnight, after which the salts formed were removed by filtration, and the solvent was then removed under vacuo.

Yield: 85%

EXAMPLES IX–XI

Example IX

Figure 3:
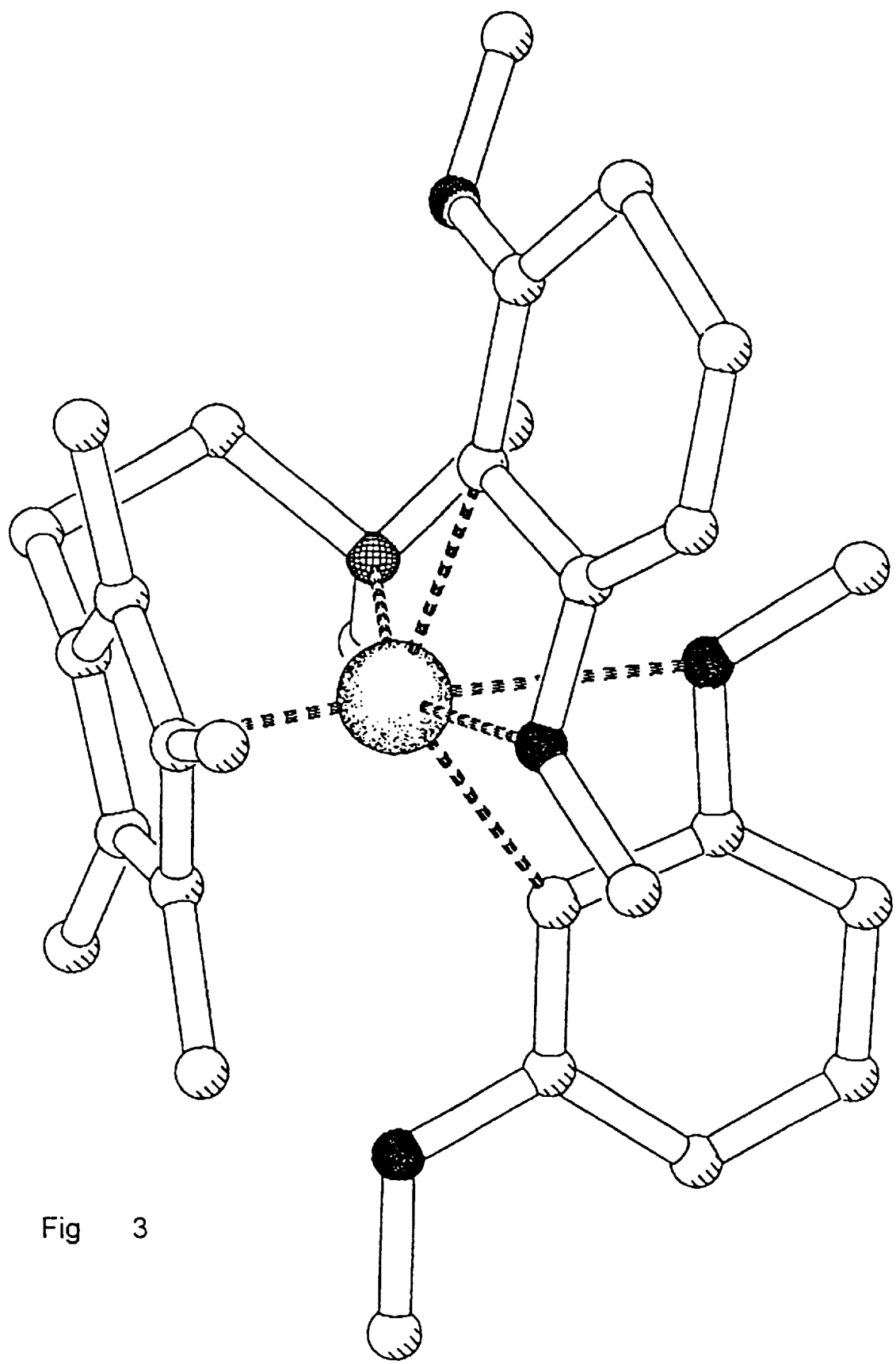

The Synthesis of [([Me$_2$NC$_2$H$_4$)C$_5$HiPr$_3$]Ti(C$_6$H$_3$-2,6-OMe)$_2$ 0.236 g of [(Me$_2$NC$_2$H$_4$)C$_5$HiPr$_3$]TiCl$_2$ (0.62 mmol) and 0.178 g of 2-lithio-1,3-dimethoxybenzene (Example III) were brought together in a Schlenk-vessel. The powder-mixture was suspended in 30 ml of ether, and the suspension was stirred overnight at room temperature. The reaction mixture slowly became a indigo-coloured suspension (purple-blue solution with fine white percipitate of LiCl). The solvent was removed under vacuo, then 10 ml of ligroin was added, the LiCl was removed by filtration, and the filtrate was dried under vacuo. The product was a purple solid, the yield was quantitative. Crystals suitable for X-ray diffraction were grown by placing a concentrated solution in ether in a refrigerator at −20° C. The X-ray structure is shown in FIG. 3.

EXAMPLES X and XI $[(Me_2NC_2H_4)C_5Me_4]Ti(C_6H_3\text{-}2,6\text{-}OMe)_2$ and $[(Me_2NC_2H_4)C_5H_2(SiMe_3)_2]Ti(C_6H_3\text{-}2,6\text{-}OMe)_2$ were prepared analogously.

EXAMPLE XII

The Synthesis of $[(Me_2NC_2H_4)C_5Me_4]Ti(C_6F_5)_2$

To a solution of 34.6 ml 1.6 M BuLi (55 mmol) in 100 ml ether at −70° C. 7.0 ml $C_6F_5Br$ (55 mmol) was added in 15 minutes. After 2 hours of stirring at −70° C. the pink-coloured $C_6F_5Li$-solution was added to a cooled (−70° C.) slurry of 9.95 g $(Me_2NC_2H_4)C_5Me_4]TiCl_2.LiCl$ (27.7 mmol) in 300 ml ether. After the green slurry was warmed up to 0° C. the clear ether layer was decanted of the formed LiCl and thereafter the ether was fully evaporated. The green residue was washed with ligroin (3×50 ml), whereafter the ligroin was fully evaporated to obtain $[(Me_2NC_2H_4) C_5Me_4]Ti(C_6F_5)_2$ as a green powder.

Yield: 6.53 g. (41%).

Figure 4:
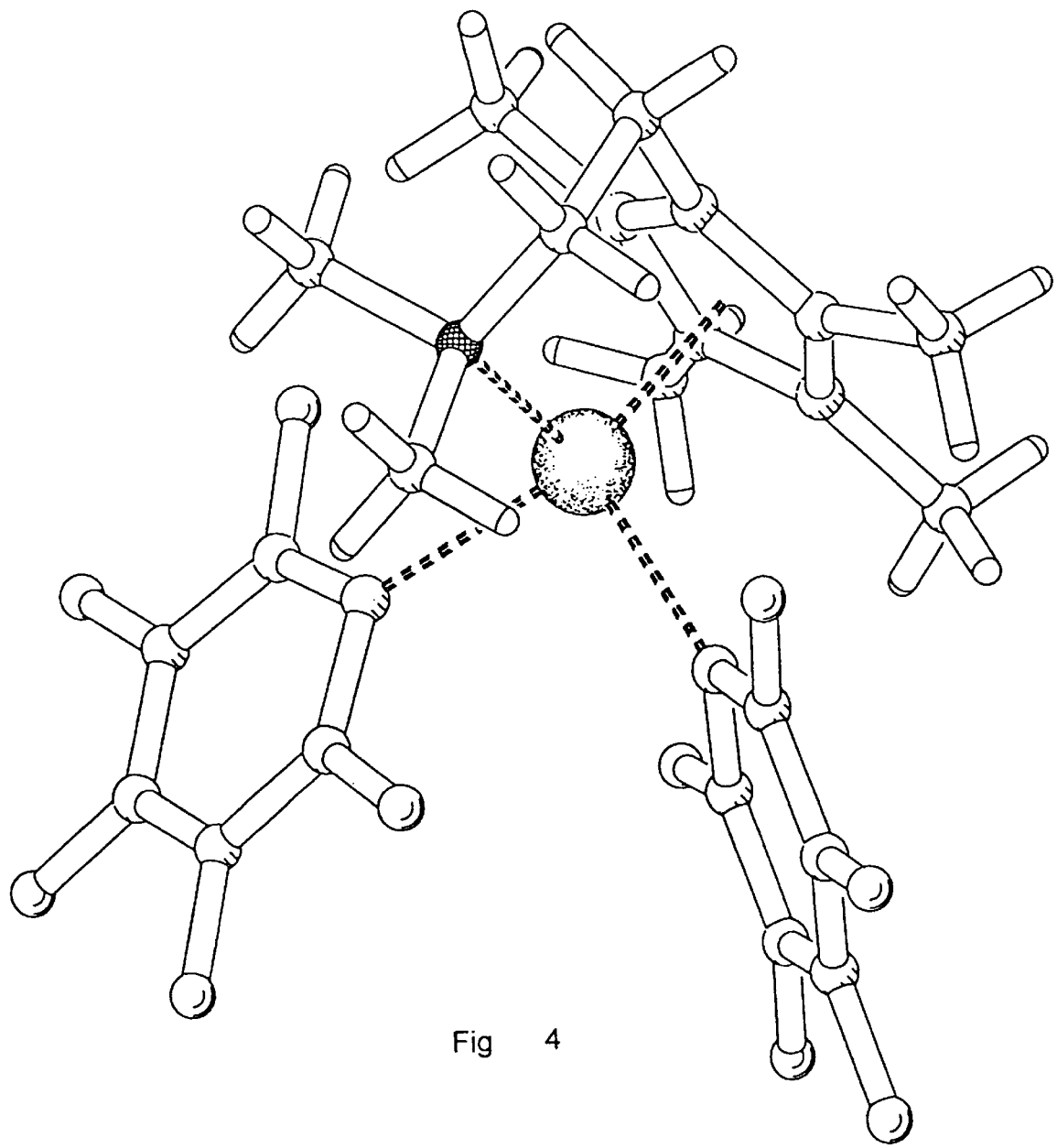

Crystals suitable for X-ray diffraction were grown by placing a concentrated solution in ether in a refrigerator at −20° C. The X-ray structure is shown in FIG. 4.

EXAMPLE XIII

The Synthesis of $[(Bu_2NC_2H_4)C_5Me_4]Ti(C_6F_5)_2$

To a solution of 19.7 ml 1.6 M BuLi (31.5 mmol) in 50 ml ether at −70° C. 3.9 ml $C_6F_5Br$ (31.6 mmol) was added in 15 minutes. After 2 hours of stirring at −70° C. the pink-coloured $C_6F_5Li$-solution was added to a cooled (−70° C.) slurry of 6.25 g $(Bu_2NC_2H_4)C_5Me_4]TiCl_2$ (15.8 mmol) in 150 ml ether. After the green slurry was warmed up to 0° C. the browngreen slurry was filtered from the LiCl. Thereafter the ether was fully evaporated. The browngreen residue was washed with ligroin (150 ml), whereafter the slurry was filtrated and $[(Bu_2NC_2H_4)C_5Me_4]Ti(C_6F_5)_2$ was obtained as an oil.

EXAMPLE XIV

The Synthesis of $[(Me_2NC_2H_4)C_5H_2(SiMe_3)_2]Ti(C_6F_5)_2$

To a solution of 38 ml 1.6 M BuLi (60.8 mmol) in 75 ml ether at −70° C. 7.8 ml $C_6F_5Br$ (62 mmol) was added in 15 minutes. After 2 hours of stirring at −70° C. the pink-coloured $C_6F_5Li$-solution was added to a cooled (−70° C.) slurry of 12.44 g $[(Me_2NC_2H_4)C_5H_2(SiMe_3)_2]TiCl_2$ (31.2 mmol) in 300 ml ether. After the purple slurry was warmed up to 0° C. the clear ether layer was decanted of the formed LiCl and thereafter the ether was fully evaporated. The purple residue was washed with ligroin (3×50 ml), whereafter the ligroin was fully evaporated to obtain $[(Me_2NC_2H_4)C_5H_2(SiMe_3)_2]Ti(C_6F_5)_2$ as a purple powder.

Yield: 16.9 g. (82%).

EXAMPLE XV

The Synthesis of $[(Me_2NC_2H_4)C_5H(SiMe_3)_3]Ti(C_6F_5)_2$

To a solution of 18.5 ml 1.6 M BuLi (29.7 mmol) in 100 ml ether at −70° C. 3.6 ml $C_6F_5Br$ (29.7 mmol) was added in 15 minutes. After 2 hours of stirring at −70° C. the pink-coloured $C_6F_5Li$-solution was added to a cooled (−70° C.) slurry of 7.0 g $[(Me_2NC_2H_4)C_5H(SiMe_3)_3]TiCl_2$ (14.8 mmol) in 70 ml ether. After the purple slurry was warmed up to 0° C. the clear ether layer was decanted of the formed LiCl and thereafter the ether was fully evaporated. The purple residue was washed with ligroin (3×100 ml), whereafter the ligroin was fully evaporated to obtain $[(Me_2NC_2H_4)C_5H(SiMe_3)_3]Ti(C_6F_5)_2$ as a purple powder.

Yield: 2.55 g. (12%).

EXAMPLE XVI

The Synthesis of $[(Me_2NC_2H_4)C_5HiPr(SiMe_3)_2]Ti(C_6F_5)_2$

To a solution of 3.66 ml 1.6 M BuLi (5.87 mmol) in 30 ml ether at −70° C. 0.73 ml $C_6F_5Br$ (5.87 mmol) was added in 15 minutes. After 2 hours of stirring at −70° C. the pink-coloured $C_6F_5Li$-solution was added to a cooled (−70° C.) slurry of 1.30 g $[(Me_2NC_2H_4)C_5HiPr(SiMe_3)_2]TiCl_2$ (2.94 mmol) in 40 ml ether. After the purple slurry was warmed up to room temperature the slurry was filtered from the formed LiCl and thereafter the ether was fully evaporated. The purple residue was washed with ligroin (2×25 ml), whereafter the ligroin was fully evaporated to obtain $[(Me_2NC_2H_4)C_5HiPr(SiMe_3)_2]Ti(C_6F_5)_2$ as a purple powder.

Yield: 0.77 g. (37%).

EXAMPLE XVII

The Synthesis of $[(Me_2NC_2H_4)C_5H_2iPr(SiMe_3)]Ti(C_6F_5)_2$

To a solution of 3.60 ml 1.6 M BuLi (5.86 mmol) in 20 ml ether at −70° C. 0.80 ml $C_6F_5Br$ (5.86 mmol) was added in 15 minutes. After 2 hours of stirring at −70° C. the pink-coloured $C_6F_5Li$-solution was added to a cooled (−70° C.) slurry of 1.00 g $[(Me_2NC_2H_4)C_5H_2iPr(SiMe_3)]TiCl_2$ (2.93 mmol) in 40 ml ether. After the purple slurry was warmed up to room temperature the slurry was filtered from the formed LiCl and thereafter the ether was fully evaporated. The purple residue was dissolved in ligroin (40 ml), whereafter the solution was decanted of a black residue. After the ligroin was fully evaporated $[(Me_2NC_2H_4)C_5H_2iPr(SiMe_3)]Ti(C_6F_5)_2$ was obtained as a purple powder.

Yield: 1.13 g. (61%).

EXAMPLE XVIII

The Synthesis of $[(Me_2NC_2H_4)C_5HiPr_3]Ti(C_6F_5)_2$

To a solution of 5.0 ml 1.6 M BuLi (8.02 mmol) in 40 ml ether at −70° C. 1.98 g. $C_6F_5Br$ (8.02 mmol) was added in 15 minutes. After 2 hours of stirring at −70° C. the pink-coloured $C_6F_5Li$-solution was added to a cooled (−70° C.) slurry of 1.70 g $[(Me_2NC_2H_4)C_5HiPr_3]TiCl_2$ (4.01 mmol) in 30 ml ether. After the darkblue slurry was warmed up to room temperature the clear ether layer was decanted of the formed LiCl and thereafter the ether was fully evaporated. The green residue was washed with ligroin (2×10 ml), whereafter the ligroin was fully evaporated to obtain $[(Me_2NC_2H_4)C_5HiPr_3]Ti(C_6F_5)_2$ as a green powder.

Yield: 0.40 g. (16%).

EXAMPLE XIX

The Synthesis of $[(Ph_2PC_2H_4)C_5Me_4]Ti(C_6F_5)_2$

To a solution of −70° C. of 0.58 g $[(Ph_2PC_2H_4)C_5Me_4]TiCl_2$ (1.17 mmol) in 30 ml ether a solution of $C_6F_5Li$ (2.32 mmol) was added. After the green slurry was warmed up to room temperature the slurry was filtered of the formed LiCl and thereafter the ether was fully evaporated. The green residue was washed with ligroin (2×25 ml), whereafter the ligroin was fully evaporated to obtain $[(Ph_2PC_2H_4)C_5Me_4]Ti(C_6F_5)_2$ as a green powder.

Yield: 0.60 g. (72%).

EXAMPLE XX

The Synthesis of $[(Ph_2P(CH_2SiMe_2))C_5Me_4]Ti(C_6F_5)_2$

To a solution of −70° C. of 0.30 g $[(Ph_2P(CH_2SiMe_2))C_5Me_4]TiCl_2$ (0.6 mmol) in 30 ml ether a solution of $C_6F_5Li$ (1.2 mmol) was added. After the green slurry was warmed up to room temperature the slurry was filtered of the formed LiCl and thereafter the ether was fully evaporated. The green residue was washed with ligroin (2×70 ml), whereafter the ligroin was fully evaporated to obtain [(Ph$_2$P(CH$_2$SiMe$_2$)) C$_5$Me$_4$]Ti(C$_6$F$_5$)$_2$ as a green powder.

EXAMPLE XXI

The Synthesis of [(Me$_2$NC$_2$H$_4$)C$_5$H$_2$(SiMe$_3$)$_2$]Ti(C$_6$H$_3$-2,6-F$_2$)$_2$ To a solution of 5.5 ml 1.6 M BuLi (8.8 mmol) in 25 ml ether at −70° C. 7.8 ml of 2,6-difluoro-bromobenzene (8.8 mmol) was added in 15 minutes. After 2 hours of stirring at −70° C. the pink-coloured C$_6$F$_5$Li-solution was added to a cooled (−70° C.) slurry of 1.75 g [(Me$_2$NC$_2$H$_4$)C$_5$H$_2$(SiMe$_3$)$_2$]TiCl$_2$ (4.4 mmol) in 30 ml ether. After the purple slurry was warmed up to 0° C. the clear ether layer was decanted of the formed LiCl and thereafter the ether was fully evaporated. The purple residue was washed with ligroin (20 ml), whereafter the ligroin was fully evaporated to obtain [(Me$_2$NC$_2$H$_4$)C$_5$H$_2$(SiMe$_3$)$_2$]Ti(C$_6$H$_3$-2,6-F$_2$)$_2$ as a purple powder.

EXAMPLE XXII

The Synthesis of [(Me$_2$NC$_2$H$_4$)C$_5$Me$_4$]Ti(C$_6$F$_5$)Cl

To a solution of 5.0 ml 1.6 M BuLi (8.1 mmol) in 30 ml ether at −70° C. 2.0 g C$_6$F$_5$Br (8.1 mmol) was added in 15 minutes. After 2 hours of stirring at −70° C. the pink-coloured C$_6$F$_5$Li-solution was added to a cooled (−70° C.) slurry of 2.86 g [(Me$_2$NC$_2$H$_4$)C$_5$Me$_4$]TiCl$_2$.LiCl (8.1 mmol) in 20 ml ether. The bluegreen slurry was stirred for 1 hour at room temperature and then the ether was fully evaporated. Thereafter the slurry was extracted with 60 ml warm toluene and filtrated. The blue toluenefiltrate was stored for 10 hours at −20° C. and thereafter the toluene was decanted. The blue residue was washed with ligroin (2×20 ml), whereafter the ligroin was fully evaporated to obtain [(Me$_2$NC$_2$H$_4$)C$_5$Me$_4$]Ti(C$_6$F$_5$)Cl as blue crystals.

Yield: 1.80 g. (50%).

Figure 5:
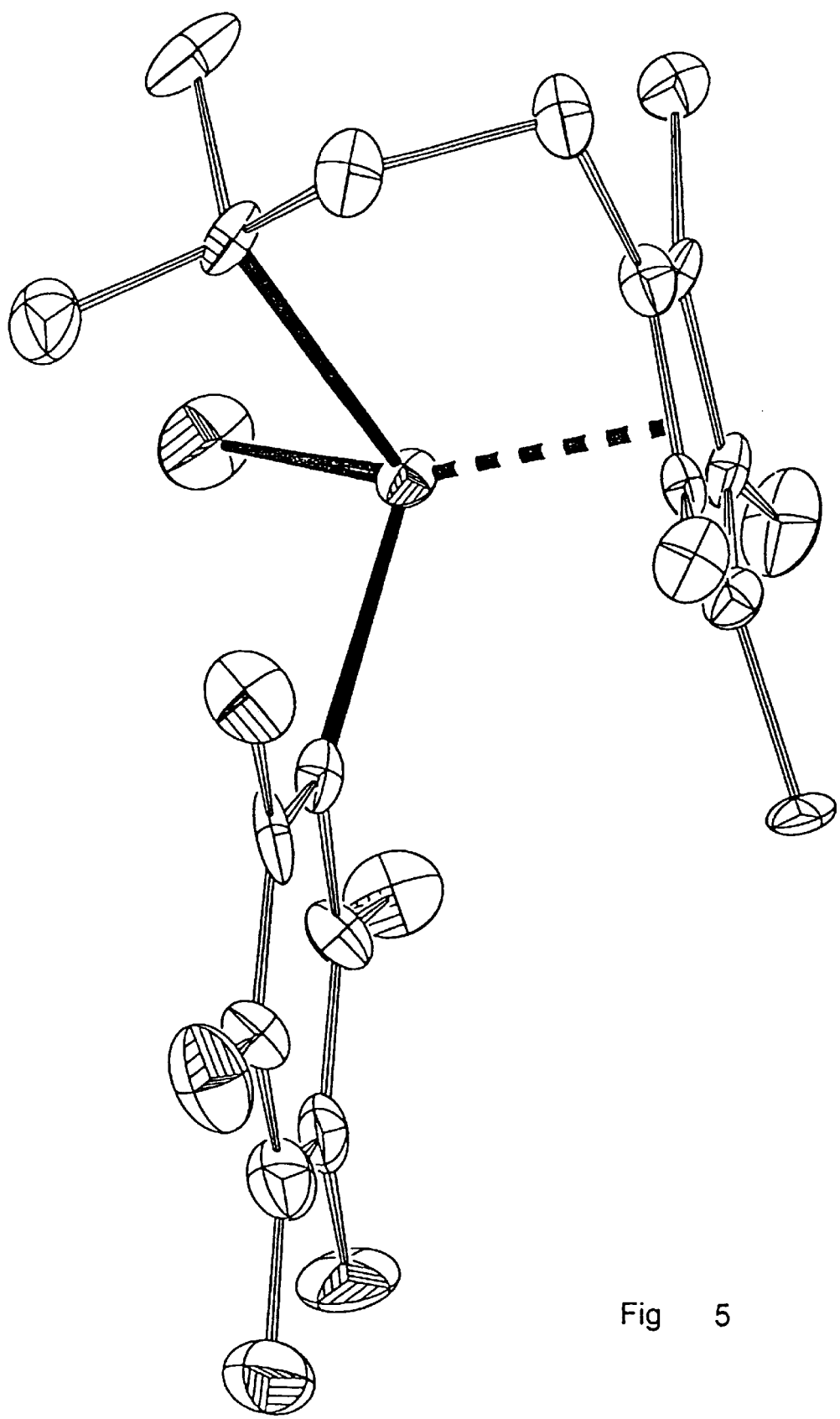

Crystals suitable for X-ray diffraction were grown by placing a concentrated solution in ether in a refrigerator at −20° C. The X-ray structure is shown in FIG. 5.

EXAMPLE XXIII

The Synthesis of [(Me$_2$NC$_2$H$_4$)C$_5$Me$_4$]Ti(C$_6$F$_5$)Me.

To 1.10 g. [(Me$_2$NC$_2$H$_4$)C$_5$Me$_4$]Ti(C$_6$F$_5$)Cl (2,48 mmol) solved in 20 ml ether at −70° C. 1.5 ml 1.6 M MeLi (2.48 mmol) was added slowly. After stirring for 1 hour at room temperature the darkgreen solution was filtrated and the ether was fully evaporated. [(Me$_2$NC$_2$H$_4$)C$_5$Me$_4$]Ti(C$_6$F$_5$)Me was obtained as a green oil.

EXAMPLE XXIV

The Synthesis of [(Me$_2$NC$_2$H$_4$)C$_5$H$_2$(SiMe$_3$)$_2$]Ti(C$_6$F$_5$)Cl

To a solution of 5.2 ml 1.6 M BuLi (8.3 mmol) in 25 ml ether at −70° C. 2.0 g. C$_6$F$_5$Br (8.1 mmol) was added in 15 minutes. After 2 hours of stirring at −70° C. the pink-coloured C$_6$F$_5$Li-solution was added to a cooled (−70° C.) slurry of 3.30 g [(Me$_2$NC$_2$H$_4$)C$_5$H$_2$(SiMe$_3$)$_2$]TiCl$_2$ (8.3 mmol) in 20 ml ether. After the purple slurry was warmed up to 0° C. the clear ether layer was decanted of the formed LiCl and thereafter the ether was fully evaporated. The purple residue was washed with ligroin (50 ml), whereafter the ligroin was fully evaporated to obtain [(Me$_2$NC$_2$H$_4$)C$_5$H$_2$(SiMe$_3$)$_2$]Ti(C$_6$F$_5$)Cl as a purple powder.

Yield: 4.10 g. (93%).

EXAMPLE XXV

The Synthesis of [(Me$_2$NC$_2$H$_4$)C$_5$H$_2$(SiMe$_3$)$_2$]Ti(C$_6$F$_5$)Me

To 1.54 g. [(Me$_2$NC$_2$H$_4$)C$_5$H$_2$(SiMe$_3$)$_2$]Ti(C$_6$F$_5$)Cl (2,48 mmol) dispersed in 30 ml ether at −70° C. 1.8 ml 1.6 M MeLi (2.90 mmol) was added slowly. After stirring for 1 hour at room temperature the red solution was decanted of the formed LiCl and thereafter the ether was fully evaporated. [(Me$_2$NC$_2$H$_4$)C$_5$H$_2$(SiMe$_3$)$_2$]Ti(C$_6$F$_5$)Me was obtained as a red oil.

EXAMPLE XXVI

The Synthesis of [(Me$_2$NC$_2$H$_4$)C$_5$Me$_4$]Ti(C$_6$H$_3$-2,6-(OMe)$_2$)Cl

To a slurry of 10.59 g [(Me$_2$NC$_2$H$_4$)C$_5$Me$_4$]TiCl$_2$.LiCl (30 mmol) in 160 ml ether 4.30 g solid 2-lithio-resorcinol-dimethylether was added at room temperature. After 1 hour of stirring the green slurry was filtered. The green filtrate was stored for 20 hours at −20° C. Thereafter the brown ether layer was decanted of the formed crystals. The green crystals were washed with ligroin (2×30 ml), whereafter the ligroin was fully evaporated to obtain [(Me$_2$NC$_2$H$_4$)C$_5$Me$_4$]Ti(C$_6$H$_3$-2,6-(OMe)$_2$)Cl as green crystals.

Yield: 8.20 g. (67%)

Figure 6:
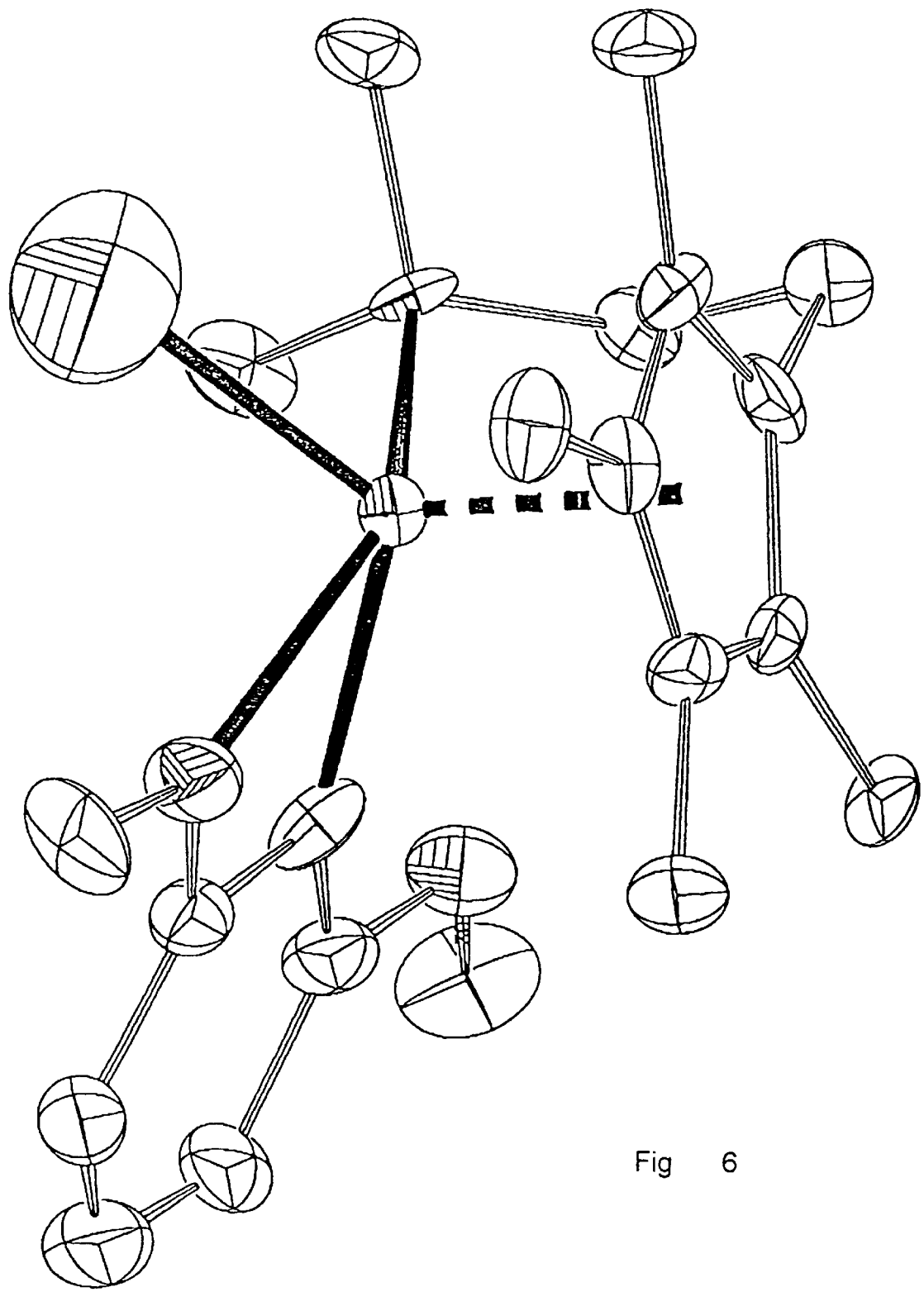

Crystals suitable for X-ray diffraction were grown by placing a concentrated solution in ether in a refrigerator at −20° C. The X-ray structure is shown in FIG. 6.

EXAMPLE XXVII

The Synthesis of [(Me$_2$NC$_2$H$_4$)C$_5$Me$_4$]Ti(C$_6$H$_3$-2,6-(OMe)$_2$)Me

To 11.4 g. [(Me$_2$NC$_2$H$_4$)C$_5$Me$_4$]Ti(C$_6$H$_3$-2,6-(OMe)$_2$)Cl (27.6 mmol) dispersed in 300 ml ether at −70° C. 17 ml 1.6 M MeLi (27.6 mmol) was added slowly. After stirring for 2 hours at room temperature the brown solution was filtered to remove the formed LiCl and thereafter the ether was fully evaporated. The brown residue was dissolved in 100 ml ligroin. After evaporation of the ligroin ([(Me$_2$NC$_2$H$_4$)C$_5$Me$_4$]Ti(C$_6$H$_3$-2,6-(OMe)$_2$)Me was obtained as a brown powder.

Yield: 10.90 g. (100%)

EXAMPLE XXVIII

The Synthesis of [(Me$_2$NC$_2$H$_4$)C$_5$H$_2$](SiMe$_3$)$_2$]Ti(C$_6$H$_3$-2,6-(OMe)$_2$)Cl To 11.37 g. [(Me$_2$NC$_2$H$_4$)C$_5$H$_2$(SiMe$_3$)$_2$]TiCl$_2$ (28.5 mmol) dispersed in 80 ml ether at −70° C. 4.11 g. solid 2-lithio-resorcinol-dimethylether was added. After stirring for 1 hour at room temperature the blue slurry was filtered to remove the formed LiCl and thereafter the ether was fully evaporated. The blue residue was washed with 20 ml ligroin. After evaporation of the ligroin the residue was washed again with (2×30 ml) ligroin. Thereafter the ligroin was evaporated again and [(Me$_2$NC$_2$H$_4$)C$_5$H$_2$ (SiMe$_3$)$_2$]Ti(C$_6$H$_3$-2,6-(OMe)$_2$)Cl was obtained as a blue powder.

Yield: 11.0 g (67%)

EXAMPLE XXIX

The Synthesis of [(Me$_2$NC$_2$H$_4$)C$_5$H$_2$(SiMe$_3$)$_2$]Ti(C$_6$H$_3$-2,6-(OMe)$_2$)Me To 5.7 g. [(Me$_2$NC$_2$H$_4$)C$_5$H$_2$(SiMe$_3$)$_2$]Ti(c$_6$H$_3$-2,6-(OMe)$_2$)Cl (11.4 mmol) dissolved in 50 ml ether at −70° C. 3.8 ml 3.0 M MeMgBr (11.4 mmol) was added slowly. After stirring for 1 hour at room temperature the purple slurry was filtered to remove the formed magnesiumsalts and thereafter the ether was fully evaporated. The puple residue was washed with 20 ml ligroin. After evaporation of the ligroin

[(Me$_2$NC$_2$H$_4$)C$_5$H$_2$(SiMe$_3$)$_2$]Ti(C$_6$H$_3$-2,6-(OMe)$_2$)Me was obtained as a purple powder.
Yield 2.30 g (42%).

EXAMPLE XXX
The Synthesis of [(Me$_2$NC$_2$H$_4$)C$_5$H(SiMe$_3$)$_3$]Ti(C$_6$H$_3$-2,6-(OMe)$_2$)Cl To 24.8 g. [(Me$_2$NC$_2$H$_4$)C$_5$H(SiMe$_3$)$_3$]TiCl$_2$ (52.6 mmol) dissolved in 300 ml ether at −70° C. 7.58 g. solid Li(resorcinol) (52.6 mmol) was added. After stirring for 1 hour at room temperature the grey slurry was filtered to remove the formed LiCl and thereafter the ether was fully evaporated. The grey residue was washed with 100 ml ligroin. After evaporation of the ligroin [(Me$_2$NC$_2$H$_4$)C$_5$H(SiMe$_3$)$_3$]Ti(C$_6$H$_3$-2,6-(OMe)$_2$)Cl was obtained as a grey powder.

EXAMPLE XXXI
The Synthesis of [(Me$_2$NC$_2$H$_4$)C$_5$H(SiMe$_3$)$_3$]Ti(C$_6$H$_3$-2,6-(OMe)$_2$)Me To 0.81 g. [(Me$_2$NC$_2$H$_4$)C$_5$H(SiMe$_3$)$_3$]Ti(C$_6$H$_3$-2,6-(OMe)$_2$)Cl (1.41 mmol) dissolved in 70 ml ether at −70° C. 0.85 ml 1.6 M MeLi (1.36 mmol) was added slowly. After stirring for 2 hours at room temperature the brown slurry was filtered to remove the formed LiCl and thereafter the ether was fully evaporated. The brown residue was dissolved in 60 ml ligroin. After evaporation of the ligroin [(Me$_2$NC$_2$H$_4$)C$_5$H(SiMe$_3$)$_3$]Ti(C$_6$H$_3$-2,6-(OMe)$_2$)Me was obtained as a brown oil.

EXAMPLE XXXII
The Synthesis of [(Me$_2$NC$_2$H$_4$)C$_5$H$_2$(SiMe$_3$)$_2$]CrCl$_2$.LiCl To 2.27 g. (Me$_2$NC$_2$H$_4$)C$_5$H$_3$(SiMe$_3$)$_2$ (8.07 mmol) dissolved in 50 ml THF 5.04 ml of a 1.6 M solution of n-butyllithium in ligroin (8.07 mmol) was added dropwise and the reaction mixture was stirred for 1 hour. The solution was then cooled to −60° C. 3.03 g of CrCl$_3$.3 THF (8.08 mmol) was dissolved in 30 ml of THF, and the solution was cooled to −60° C. These solutions were combined, and a slow colouration to dark blue was observed. This mixture was stirred for 2 hours, during which warming to room temperature was allowed. The solvent was removed under vacuo.

EXAMPLE XXXIII
[(Me$_2$NC$_2$H$_4$)C$_5$Me$_4$]CrCl$_2$.LiCl was prepared according to the method described in example XXXII.

EXAMPLE XXXIV
The Synthesis of [(Me$_2$NC$_2$H$_4$)C$_5$H$_2$(SiMe$_3$)$_2$]Cr(C$_6$F$_5$)$_2$ 0.95 g of [(Me$_2$NC$_2$H$_4$)C$_5$H$_2$(SiMe$_3$)$_2$]CrCl$_2$.LiCl (2.132 mmol) was dissolved in 20 ml of ether, and the solution was cooled to −70° C. In an other vessel 0.53 ml of C$_6$F$_5$Br (4.251 mol) was added to 2.65 ml of a 1.6 M solution of n-butyllithium in ligroin (4.251 mmol) in 30 ml of ether at −70° C. The two solutions were combined, and the mixture was allowed to warm to room temperature. The solution coloured to dark purple, and the formation of a white precipitate (LiCl) was observed. A room temperature, the solution was stirred for 1 more hour, the the solvent was removed by evaporation. The residue was extracted with a mixture of ligroin (60 ml) and ether (20 ml). The solvent of the extract was removed under vacuo.

EXAMPLE XXXV
[(Me$_2$NC$_2$H$_4$)C$_5$Me$_4$]Cr(C$_6$F$_5$)$_2$ was prepared according to the method described in example XXXIV.

EXAMPLE XXXVI
The Synthesis of [(Me$_2$NC$_2$H$_4$)C$_5$Me$_4$]CrCl(C$_6$H$_3$-2,6-(OMe)$_2$)

A slurry of 0.88 g of solid 2-lithio-resorcinol-dimethylether was dispersed in 30 mL of ether. At −70° C., 2.0 g of [(Me$_2$NC$_2$H$_4$)C$_5$Me$_4$]CrCl$_2$.LiCl (5.59 mmol) was added. The colour of the reaction mixture turned from blue to bluegreen upon warming to room temperature. The mixture was stirred at room temperature for 1 hour, filtered to remove the LiCl formed during the reaction, and evaporated.

EXAMPLE XXXVII
The Synthesis of [(Me$_2$NC$_2$H$_4$)C$_5$Me$_4$]CrMe(C$_6$H$_3$-2,6-(OMe)$_2$)

To a green solution of 0.53 g of [(Me$_2$NC$_2$H$_4$)C$_5$Me$_4$]CrCl(C$_6$H$_3$-2,6-(OMe)$_2$) (1.27 mmol) dissolved in 25 mL of ether, at −70° C. 0.80 mL of a 1.6 molar solution of MeLi in ether was added. Upon warming of the reaction mixture to room temperature a colouration to brown was observed. The reaction mixture was stirred form 1 hour, then evaporated to dryness. The resulting solid was extracted with ligroin, the filtered extract was dried under vacuo.

EXAMPLE XXXVIII
The Synthesis of [(Me$_2$NC$_2$H$_4$)C$_5$Me$_4$]Cr(C$_6$H$_3$-2,6-(OMe)$_2$)$_2$ A slurry of 1.79 g of [(Me$_2$NC$_2$H$_4$)C$_5$Me$_4$]CrCl$_2$.LiCl (5.0 mmol) in 40 mL of ether was cooled to −70° C, and 1.44 g of solid 2-lithio-resorcinol-dimethylether was added. The colour of the reaction mixture turned from blue to deep green. The mixture was stirred at room temperature, and was filtered to remove the LiCl formed during the reaction, and evaporated.

Ethylene Polymerizations Under Solution Conditions

EXAMPLES XXXIX–LV
and

Experiments A–D 400 ml of pentamethyl heptane (abbreviation: PMH) and ethene was supplied to a 1.3-liter reactor, with heating to polymerization temperature (150° C.); the pressure was 2 MPa. Next, the required amount of Al(C$_8$H$_{17}$)$_3$ and/or triethylaluminum (TEA) and [PhNMe$_2$H][B(C$_6$F$_5$)$_4$] dissolved in toluene (Witco; 1.6 M) and the catalyst solution or slurry were premixed at room temperature for 1 minute and then supplied to the reactor. The catalyst supply vessel was rinsed out with 100 ml of pentamethylheptane (PMH). The pressure in the reactor was kept constant by supplying ethene. By cooling the reactor the temperature deviation from the setting (150° C., unless stated otherwise) was limited to a maximum of 5° C. After 10 minutes the polymerization was stopped and the polymer was worked up by draining the solution and boiling it down under vacuum at 50° C. The results are shown in Table 1–4.

TABLE 1

| Example | Complex A | [Al]/[Ti] | [B]/[Ti] | Catyield (kg/gTi*5 min) |
|---|---|---|---|---|
| Comparative Example A | [Me$_2$NC$_2$H$_4$C$_5$Me$_4$]TiMe$_2$ | 40 | 2 | 33 |
| XXXIX | XII | 40 | 2 | 33 |
| XL | XIII | 40 | 2 | 33 |
| XLI | XIV | 40 | 2 | 44 |
| XLII | XV | 40 | 2 | 41 |

TABLE 1-continued

| Example | Complex A | [Al]/[Ti] | [B]/[Ti] | Catyield (kg/gTi*5 min) |
|---|---|---|---|---|
| XLIII | XVI | 40 | 2 | 40 |
| Comparative Example B | [Me$_2$NC$_2$H$_4$C$_5$H$_2$(SiMe$_3$)$_2$]TiMe$_2$ | 40 | 2 | 0 |
| XLIV | XVII | 40 | 2 | 29 |
| XLV | XVIII | 40 | 2 | 34 |
| XLVI | XXI | 10 | 20 | 47 |

[B] = concentration of cocatalyst [PhNMe$_2$H][B(C$_6$F$_5$)$_4$],
[Al] = concentration of Al(C$_8$H$_{17}$)$_3$
[Ti] = concentration of Ti

TABLE 2

| Example | Complex | [TEA]/[Ti] | [B]/[Ti] | Catyield (kg/gTi*5 min) |
|---|---|---|---|---|
| A a–d | Cp*EtNMe$_2$TiMe$_2$ | 40 | 2 | 33 |
|  |  | 1 | 2 | 29 |
|  |  | 2 | 2 | 37 |
|  |  | 10 | 2 | 49 |
| XLVII a–f | XXII | 20 | 2 | 48 |
|  |  | 40 | 2 | 39 |
|  |  | 80 | 2 | 3 |
|  |  | 1 | 2 | 22 |
|  |  | 2 | 2 | 21 |
|  |  | 10 | 2 | 28 |
| XLVIII a–c | XXVI | 20 | 2 | 30 |
|  |  | 40 | 2 | 29 |
|  |  | 160 | 2 | 26 |

[B] = concentration of cocatalyst [PhNMe$_2$H][B(C$_6$F$_5$)$_4$],
[Ti]/[Al(C$_8$H$_{17}$)$_3$] = 20
Ti = concentration of Ti

TABLE 3

| Example | Complex | [Al]/[Ti] | [B]/[Ti] | Catyield (kg/gTi*5 min) |
|---|---|---|---|---|
| Comparative Example C | [Me$_2$NC$_2$H$_4$C$_5$Me$_4$]TiMe$_2$ | 20 | 2 | 33 |
| XLIX | XXIII | 20 | 2 | 36 |
| L | XXV | 20 | 2 | 35 |
| LI | XXVII | 20 | 2 | 39 |
| LII | XXXI | — | 2 | 33 |

[B] = concentration of cocatalyst [PhNMe$_2$H][B(C$_6$F$_5$)$_4$],
[Al] = concentration of Al(C$_8$H$_{17}$)$_3$
[Ti] = concentration of Ti

TABLE 4

| Example | Complex | [Al]/[Cr] | [B]/[Cr] | Catyield (kg/gCr*5 min) |
|---|---|---|---|---|
| Comparative example D a–b | [(Me$_2$NC$_2$H$_4$)C$_5$Me$_4$]CrMe$_2$ | 20 | 2 | 18 |
|  | [(Me$_2$NC$_2$H$_4$)C$_5$Me$_4$]CrMe$_2$ | 0 | 2 | 24* |
| LIII | XXXV | 20 | 2 | 36* |
| LIV | XXXVII | 20 | 2 | 52* |
| LV | XXXVII | 0 | 2 | 62* |

*polymerisation temperature is 120° C.
[B] = concentration of cocatalyst [PhNMe$_2$H][B(C$_6$F$_5$)$_4$],
[Al] = concentration of Al(C$_8$H$_{17}$)$_3$
[Cr] = concentration of Cr

What is claimed is:

1. Catalyst composition comprising a reduced transition metal complex and a cocatalyst, wherein the reduced transition metal complex has the following structure:

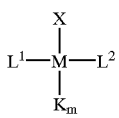

(I)

wherein:
M is a reduced transition metal selected from the group consisting of group 4, group 5 and group 6 of the Periodic Table of the Elements;
X is a multidentate monoanionic ligand represented by the formula

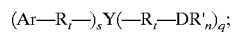

Y is a member selected from the group consisting of a cyclopentadienyl, imido (—NR'—), phosphinido (—PR'—) and a boratabenzene group;
R is at least one member selected from the group consisting of (i) a connecting group between the Y group and the DR'$_n$ group and (ii) a connecting group between the Y group and the Ar group, wherein when the ligand X contains more than one R group, the R groups are identical to or different from each other;
D is an electron-donating hetero atom selected from group 15 or group 16 of the Periodic Table of Elements;
R' is a substituent selected from the group consisting of a hydrogen, hydrocarbon radical and hetero atom-containing moiety, except that R' cannot be hydrogen when R' is directly bonded to the electron-donating hetero atom D, wherein when the multidentate monoanionic ligand X contains more than one substituent R', the substituents R' are identical to or different from each other;
Ar is an electron-donating aryl group;
L$^1$ is a monoanionic ligand bonded to the reduced transition metal M via a covalent metal-carbon bond and additionally L$^1$ is able to non-covalently interact with the metal via one or more functional groups and wherein L$^1$ is not a cyclopentadienyl group, an amido or phosphido group or an unsubstituted benzyl group;
L$^2$ is an anionic ligand wherein L$^2$ is not a cyclopentadienyl group, an amido or phosphido group;
K is a neutral or anionic ligand bonded to the reduced transition metal M, wherein when the transition metal complex contains more than one ligand K, the ligands K are identical to or different from each other;
m is the number of K ligands, wherein when the K ligand is an anionic ligand
m=0 for M$^{3+}$ and M is selected from the group consisting of groups 4, 5 and 6 of the Periodic Table of the Elements,
m=1 for M$^{4+}$ and M is selected from the group consisting of groups 5 and 6 of the Periodic Table of the Elements,
m=2 for M$^{5+}$ and M is selected from group 6 of the Periodic Table of the Elements,
and when K is a neutral ligand m increases by one for each neutral K ligand;
n is the number of the R' groups bonded to the electron-donating hetero atom D, wherein when D is selected from group 15 of the Periodic Table of Elements n is 2, and when D is selected from group 16 of the Periodic Table of Elements n is 1;

q and s are the number of (—R$_t$—DR'$_n$) groups and (Ar—R$_t$—) groups bonded to group Y, respectively, wherein q+s is an integer not less than 1; and t is the number of R groups connecting each of (i) the Y and Ar groups and (ii) the Y and DR'$_n$ groups, wherein t is selected independently as 0 or 1.

2. Catalyst composition according to claim 1, wherein the Y group is a cyclopentadienyl group.

3. Catalyst composition according to claim 2, wherein the cyclopentadienyl group is an unsubstituted or substituted indenyl, benzoindenyl, or fluorenyl group.

4. Catalyst composition according to claim 2, wherein the reduced transition metal complex has the following structure:

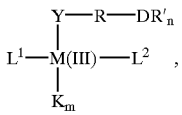

wherein:

M(III) is a transition metal from group 4, group 5 or group 6 of the Periodic Table of the Elements in oxidation state 3+.

5. Catalyst composition according to claim 2, wherein the reduced transition metal is chromium or titanium.

6. Catalyst composition according to claim 2, wherein the electron-donating hetero atom D is nitrogen or phosphorus.

7. Catalyst composition according to claim 2, wherein the R' group in the DR'$_n$ group is an n-alkyl group.

8. Catalyst composition according to claim 2, wherein the R group has the following structure:

wherein p is 1, 2, 3, or 4, wherein E is an element from group 14 of the periodic Table of the Elements, wherein each E is the same or different, and wherein R' is as defined.

9. Catalyst composition according to claim 2, wherein the Y group is a di-, tri- or tetraalkyl-cyclopentadienyl.

10. Catalyst composition according to claim 2, wherein L$^1$ is a phenyl group in which at least one of the ortho-positions is substituted with a functional group capable of donating electron density to the transition metal M.

11. Catalyst composition according to claim 2, wherein L$^1$ is a methyl group in which one or more of the alpha-positions is substituted with a functional group capable of donating electron density to the transition metal M.

12. Catalyst composition according to claim 10, wherein the functional group is an atom of group 17 of the Periodic Table of the Elements or a group containing one or more elements from groups 15, 16 or 17 of the Periodic Table of the Elements.

13. Catalyst composition according to claim 11, wherein L$^1$ is a benzyl group in which at least one of the ortho-positions is substituted with a functional group capable of donating electron density to the transition metal M.

14. Catalyst composition according to claim 2, wherein L$^1$ is 2,6-difluorophenyl, 2,4,6-trifluorophenyl, pentafluorophenyl, 2-alkoxyphenyl, 2,6-dialkoxyphenyl, 2,4,6-tri(trifluoromethyl)phenyl, 2,6-di (trifluoromethyl) phenyl, 2-trifluoromethylphenyl, 2-(dialkylamino)benzyl or 2,6-(dialkylamino)phenyl.

15. Catalyst composition according to claim 2, wherein L$^1$ is pentafluorophenyl or 2,6-dimethyoxyphenyl.

16. Catalyst composition according to claim 2, wherein L$^2$ is the same as L$^1$.

17. Catalyst composition according to claim 2, wherein the co-catalyst comprises an aluminoxane or a triaryl borane or tetraaryl borate or a silicate.

18. Catalyst composition according to claim 2, wherein at least one member selected from the group consisting of said reduced transition metal complex and said co-catalyst is supported on at least one carrier.

19. Process for the polymerization of an olefin under polymerization conditions, wherein the olefin is polymerized in the presence of a catalyst composition according to claim 1.

20. Process according to claim 19, wherein the olefin is an α-olefin.

21. Process according to claim 20, wherein the α-olefin is ethylene, propylene, butene, pentene, heptene, octene, styrene or mixtures of these.

22. Process according to claim 19, wherein the olefin comprises ethylene, propylene or mixture thereof.

23. Process according to claim 19 comprising co-polymerizing ethylene, an α-olefin and optionally a diene to prepare an elastic polymer.

24. Catalyst composition according to claim 1, wherein the reduced transition metal complex is

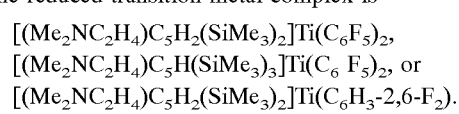

* * * * *